Aug. 26, 1924.
K. KAMBAYASHI
THERMOCOUPLE MANOMETER
Filed April 29, 1921
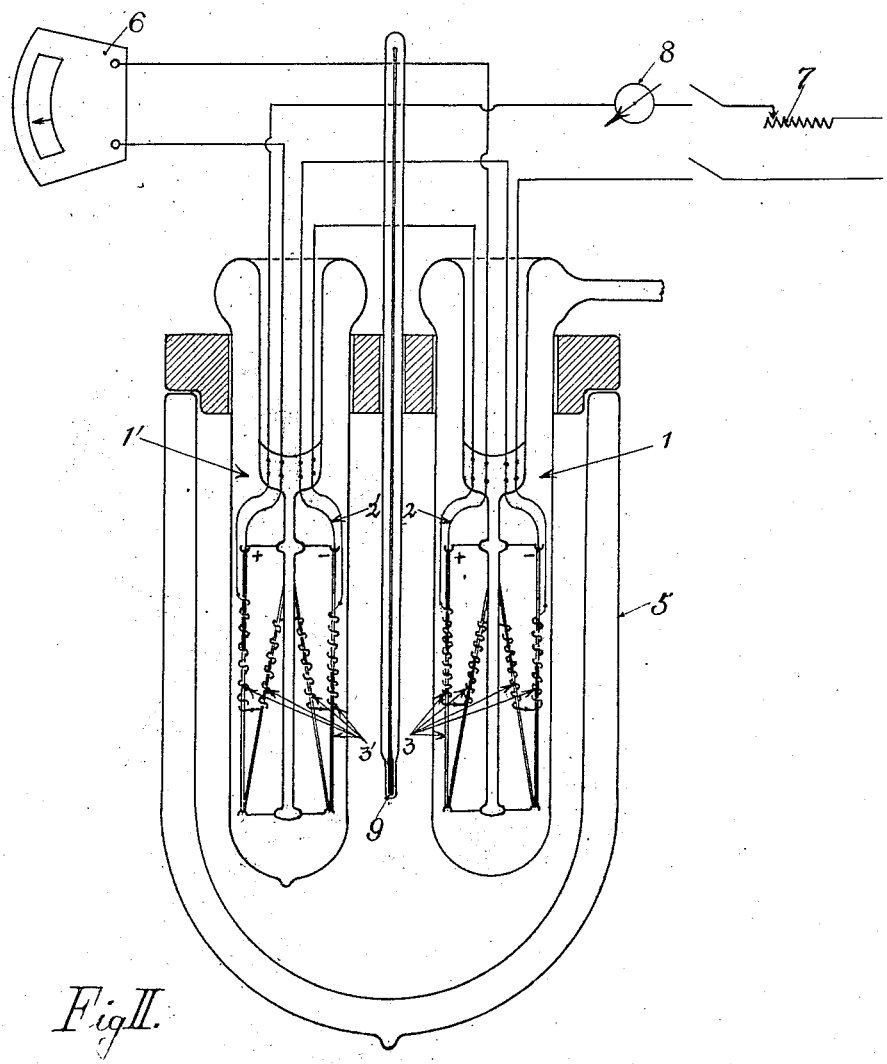
*Fig I.*
*Fig II.*
INVENTOR:
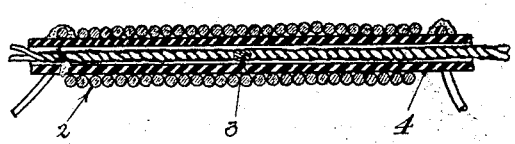
Kazuo Kambayashi
By Wm Wallace White
ATT'Y.

Patented Aug. 26, 1924.

1,506,003

UNITED STATES PATENT OFFICE.

KAZUO KAMBAYASHI, OF KUZE-GUN, JAPAN.

THERMOCOUPLE MANOMETER.

Application filed April 29, 1921. Serial No. 465,552.

*To all whom it may concern:*

Be it known that I, KAZUO KAMBAYASHI, a subject of the Emperor of Japan, residing at No. 47 Uji-cho, Kuze-gun, Kyoto Province, Japan, have invented new and useful Improvements in Thermocouple Manometers (for which I have filed an application in Japan, No. 55,981, April 8, 1920), of which the following is a specification.

This invention relates to a thermo-couple manometer consisting of thermo-couples and heating coils sealed in a glass bulb. It has for its object to provide a manometer which may measure a degree of vacuum accurately and easily.

The McLeod vacuum gauge without special devices attached, is unreliable on account of the vapour-tension of mercury. Manometers of other types are too complicated or require too much special attention for practical use. According to this invention these disadvantages may be successfully avoided.

The accompanying drawing shows an example of the present invention. Fig. 1 is a sectional elevation of a manometer embodying the principle of the invention, and Fig. 2 a sectional elevation of a metallic wire of the manometer on a large scale.

In the drawing, 3 and 3' are thermo-couples, and 2 and 2' designate heating coils wound around said couples, which are sealed in glass tubes being held by anchors as clearly shown in Fig. 1. The couples are insulated from the heating coils by means of an insulator 4. The temperature surrounding the bulb is maintained constant by means of a suitable apparatus, not shown.

The temperature-rise of a metallic wire heated by an electric current varies in proportion to the degree of vacuum in which it is kept. Therefore, the electro-motive force of the couples above mentioned should vary in proportion to the degree of vacuum in the bulb. For this reason, if the electro-motive force of the couples is measured, the degree of vacuum in the bulb may be determined.

The bulb 1' is sealed at a certain vacuum, while another bulb 1 has an open mouth. Both bulbs are enclosed in a casing 5 in which a liquid is maintained at a constant temperature. The heating coils 2 and 2' are connected in series, while the thermo-couples 3 and 3' are connected in opposition, the other terminals thereof being connected to a milivolt-meter 6 as shown in Fig. 1.

By this arrangement, an indication of the milivolt-meter is determined by the temperature difference between the junction-points of 3 and 3'; and this temperature difference, in turn, occurs because of the temperature difference between the heating coils 2 and 2'.

On account of the constant degree of vacuum in the bulb 1', the temperature difference between the heating coils 2 and 2' depends solely upon the degree of vacuum in the bulb 1, so that the degree of vacuum in the bulb 1 may be easily determined by the reading of the milivolt-meter.

When the variation of the current through the heating coils and that of the surrounding temperature of the bulbs are small, the change of temperature of the heating coils due to said variations is nearly equal in both bulbs in view of their series connection. Hence the error due to the variations may be practically neglected.

When the degree of vacuum in a vessel is to be determined, the vessel is first connected to the mouth of the bulb 1 by a convenient means. Next, the electric circuit to the heating coils is switched in, and it is regulated to get a constant electric current by means of a rheostat 7. The current is indicated by an ampère-meter 8. The temperature of the liquid in the casing 5 is maintained constant; it is read by a thermo-meter 9. Thus the reading of the milivolt-meter 6 shows the degree of vacuum in the bulb 1 as well as the vessel to be determined.

In applying this invention to the manufacturing of an incandescent electric lamp, if the bulb 1' is sealed at a proper degree of vacuum, and a polarized relay, not shown, is connected in place of the milivolt-meter 6, the current in the polarized relay changes its direction when the degree of vacuum in the bulb 1 exceeds that of the bulb 1'. Thus, by the action of the polarized relay, it can be seen if a lamp is evacuated to a necessary degree of vacuum.

Claims:—

1. A thermo-couple manometer, comprising a pair of bulbs, each provided with a thermo-couple and a heating coil wound around and insulated from said couple, one of said bulbs being sealed and the other open.

2. A thermo-couple manometer, comprising a pair of bulbs, each provided with a thermo-couple and a heating coil wound around and insulated from said couple, the heating coils of the bulbs being connected in series and the thermo-couples in opposition.

3. A thermo-couple manometer, comprising a pair of bulbs, each provided with a thermo-couple and a heating coil wound around and insulated from said couple, and a casing enclosing said bulbs.

In testimony whereof I have signed my name to this specification.

KAZUO KAMBAYASHI.